United States Patent
Judge (10) Patent No.: US 12,391,111 B2
(45) Date of Patent: Aug. 19, 2025

(54) COOLING A VEHICLE HEAT EXCHANGER

(71) Applicant: McLaren Automotive Limited, Woking (GB)

(72) Inventor: Michael Judge, London (GB)

(73) Assignee: McLaren Automotive Limited, Woking (GB)

( * ) Notice: Subject to any disclaimer, the term of this patent is extended or adjusted under 35 U.S.C. 154(b) by 0 days.

(21) Appl. No.: 17/670,208

(22) Filed: Feb. 11, 2022

(65) Prior Publication Data

US 2022/0258596 A1 Aug. 18, 2022

(30) Foreign Application Priority Data

Feb. 16, 2021 (GB) ..................................... 2102164

(51) Int. Cl.
*B60K 11/08* (2006.01)

(52) U.S. Cl.
CPC .................................. *B60K 11/085* (2013.01)

(58) Field of Classification Search
CPC ........ B60K 11/085; B60K 11/08; B60K 11/04
See application file for complete search history.

(56) References Cited

U.S. PATENT DOCUMENTS

| | | | | |
|---|---|---|---|---|
| 2,114,344 A * | 4/1938 | Haberstump | ...... | B62D 25/2036 49/467 |
| 4,455,045 A * | 6/1984 | Wheeler | ................ | B62D 35/00 296/180.1 |
| 4,772,060 A * | 9/1988 | Kretschmer | ........... | B62D 35/02 296/180.1 |
| 5,184,832 A * | 2/1993 | Miwa | ................... | B62D 35/007 296/180.1 |
| 5,322,340 A * | 6/1994 | Sato | .................... | B62D 25/2036 296/180.1 |
| 6,354,003 B1 | 3/2002 | Lehmann et al. | | |
| 7,086,692 B2 * | 8/2006 | Sebastian | ............. | B62D 25/161 296/208 |
| 8,007,037 B2 * | 8/2011 | Wolkersdorfer | ..... | B62D 35/008 296/208 |

(Continued)

FOREIGN PATENT DOCUMENTS

| DE | 19926861 | 12/2000 |
|---|---|---|
| DE | 202010010586 | 10/2010 |

(Continued)

OTHER PUBLICATIONS

Extended European Search Report in European Appln. No. 22157069, dated Jul. 19, 2022, 7 pages.

(Continued)

*Primary Examiner* — Kurt Philip Liethen
(74) *Attorney, Agent, or Firm* — Fish & Richardson P.C.

(57) ABSTRACT

A vehicle comprising: a wheel arch; an occupant door rearward of the wheel arch; a heat exchanger rearward of the occupant door; and an airflow passage configured such that, when the vehicle is in forward motion, the airflow passage directs a first rearward airflow from the wheel arch to the heat exchanger, the airflow passage comprising: a channel delimited by at least one surface of the occupant door and being at least partially open to a running surface of the vehicle; and a first inlet duct to the heat exchanger.

20 Claims, 4 Drawing Sheets

(56) References Cited

U.S. PATENT DOCUMENTS

| | | | |
|---|---|---|---|
| 9,016,763 B2* | 4/2015 | Cimatti | B62D 35/02 |
| | | | 180/903 |
| 10,953,741 B2* | 3/2021 | Temple | B60K 11/085 |
| 11,027,785 B1* | 6/2021 | Golan | B62D 35/00 |
| 2009/0025993 A1* | 1/2009 | Hines | B62D 35/00 |
| | | | 180/68.3 |
| 2012/0323448 A1* | 12/2012 | Charnesky | F01P 7/04 |
| | | | 454/145 |
| 2015/0345578 A1* | 12/2015 | Nightingale | B62D 35/005 |
| | | | 188/264 AA |
| 2016/0075383 A1* | 3/2016 | Haas | B62D 35/008 |
| | | | 296/180.1 |
| 2016/0272257 A1* | 9/2016 | McKillen | B62D 35/02 |
| 2017/0361879 A1* | 12/2017 | Frayer | B62D 35/00 |
| 2021/0016654 A1* | 1/2021 | Moss | F01P 1/06 |

FOREIGN PATENT DOCUMENTS

| | | |
|---|---|---|
| DE | 102014118631 | 6/2016 |
| EP | 2679474 | 1/2014 |
| GB | 2502963 | 12/2013 |
| GB | 2528923 | 2/2016 |
| WO | WO 2013/049900 | 4/2013 |

OTHER PUBLICATIONS

Office Action in United Kingdom Appln. No. 2102164.7, dated Jul. 21, 2021, 4 pages.

* cited by examiner

COOLING A VEHICLE HEAT EXCHANGER

CROSS-REFERENCE TO RELATED APPLICATIONS

This application claims priority to GB Patent Application Serial No. 2102164.7. filed on Feb. 16, 2021, the entire contents of which are hereby incorporated by reference.

BACKGROUND

This invention relates to cooling a vehicle heat exchanger. In particular, this invention relates to cooling a heat exchanger in a mid- or rear-engined vehicle.

In a mid-engined vehicle, the engine is typically located rearward of the front axle by which the front wheels rotate, but forward of the rear axle by which the rear wheels rotate. If any portion of the engine is located rearward of the rear axle by which the rear wheels rotate, the vehicle may be termed a rear-engined vehicle.

A heat exchanger can be used to cool the engine, and/or other operational parts of the vehicle. A radiator is an example of a heat exchanger used for this purpose. Typically, heat energy generated by the engine is transferred to a fluid circulating through the engine and the heat exchanger. The fluid is often water. In turn, the heat exchanger transfers heat energy from the fluid to its surroundings. A heat exchanger typically has a large surface area, relative to its volume, to facilitate the transfer of heat energy from the fluid to its surroundings. The transfer of heat energy from a heat exchanger to its surroundings can be increased by causing air, in particular low temperature air, to flow through (i.e. over the various surfaces of) that heat exchanger.

Positioning a heat exchanger in close proximity to the engine is advantageous, as the length of tubing used to carry the circulating fluid to/from engine can be minimised. Thus, in a mid- or rear-engined vehicle, it is often desirable to position the heat exchanger rearward of the front axle by which the front wheels rotate. That said, relative to front-engined vehicles in which the heat exchanger(s) are typically positioned in the front of the vehicle and so receive an ample flow of air when the vehicle is in forward motion, the natural flow of air to a heat exchanger positioned rearward of the front axle may be reduced.

It would be desirable if there was an improved way of cooling a heat exchanger in a mid- or rear-engined vehicle.

SUMMARY OF THE INVENTION

According to a first aspect of the present invention there is provided a vehicle comprising: a wheel arch; an occupant door rearward of the wheel arch; a heat exchanger rearward of the occupant door; and an airflow passage configured such that, when the vehicle is in forward motion, the airflow passage directs a first rearward airflow from the wheel arch to the heat exchanger, the airflow passage comprising: a channel delimited by at least one surface of the occupant door and being at least partially open to a running surface of the vehicle; and a first inlet duct to the heat exchanger.

The airflow passage may be configured such that, when the vehicle is in forward motion, the airflow passage directs the first rearward airflow from an outlet of the wheel arch, via the channel delimited by at least one surface of the occupant door, to the first inlet duct to the heat exchanger.

A second rearward airflow may be directed between the underside of the vehicle and the running surface of the vehicle when the vehicle is in forward motion such that an airflow boundary forms between the first and second rearward airflows that reduces the amount of air of the first rearward airflow that escapes from the channel delimited by at least one surface of the occupant door and being at least partially open to the running surface of the vehicle.

The vehicle may further comprise an airflow splitter forward of the wheel arch, the airflow splitter being configured such that, when the vehicle is in forward motion, the airflow splitter directs the second rearward airflow between the underside of the vehicle and the running surface of the vehicle.

The vehicle may further comprise an airflow diverter forward of the wheel arch, the airflow diverter being configured such that, when the vehicle is in forward motion, the airflow diverter directs a primary rearward airflow to the channel.

The vehicle may further comprise a wheel positioned in the wheel arch, and the airflow diverter may be configured such that, when the vehicle is in forward motion, the airflow diverter directs the primary rearward airflow inboard of the wheel.

The interior of the wheel arch may comprise one or more gradually curved faces.

The vehicle may further comprise: a second inlet duct to the heat exchanger; and a wheel arch duct configured such that, when the vehicle is in forward motion, the wheel arch duct directs a third rearward airflow from the wheel arch to a position below the second inlet duct to the heat exchanger.

The second inlet duct to the heat exchanger may be above the first inlet duct to the heat exchanger and the wheel arch duct may be above the channel.

The first and second inlet ducts to the heat exchanger may converge.

The wheel arch duct may be configured to direct the third rearward airflow to remain substantially attached to the vehicle.

The vehicle may further comprise a secondary heat exchanger forward of the wheel arch, and the wheel arch duct may be configured to receive air that has passed through the secondary heat exchanger.

The vehicle may further comprise a projection on the occupant door, the projection being configured such that, when the vehicle is in forward motion, the third rearward airflow impinges on the projection such that the projection assists the wheel arch duct in directing the third rearward airflow from the wheel arch to the position below the second inlet duct to the heat exchanger.

The projection may be a wing mirror or a component of a wing mirror.

The second inlet duct to the heat exchanger may be configured to receive a fourth rearward airflow composed of ambient air from the surroundings of the vehicle when the vehicle is in forward motion.

The fourth rearward airflow may comprise more kinetic energy per volume than the third rearward airflow and/or the fourth rearward airflow may comprise less heat energy per volume than the third rearward airflow.

The occupant door may comprise a concave surface configured such that, when the vehicle is in forward motion, it directs the fourth rearward airflow into the second inlet duct to the heat exchanger.

The third rearward airflow may be directed so as to minimise impingement of the third rearward airflow on the fourth rearward airflow.

The vehicle may be a mid- or rear-engined vehicle.

BRIEF DESCRIPTION OF THE DRAWINGS

The present invention will now be described by way of example with reference to the accompanying drawings. In the drawings.

DETAILED DESCRIPTION OF THE DRAWINGS

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1:
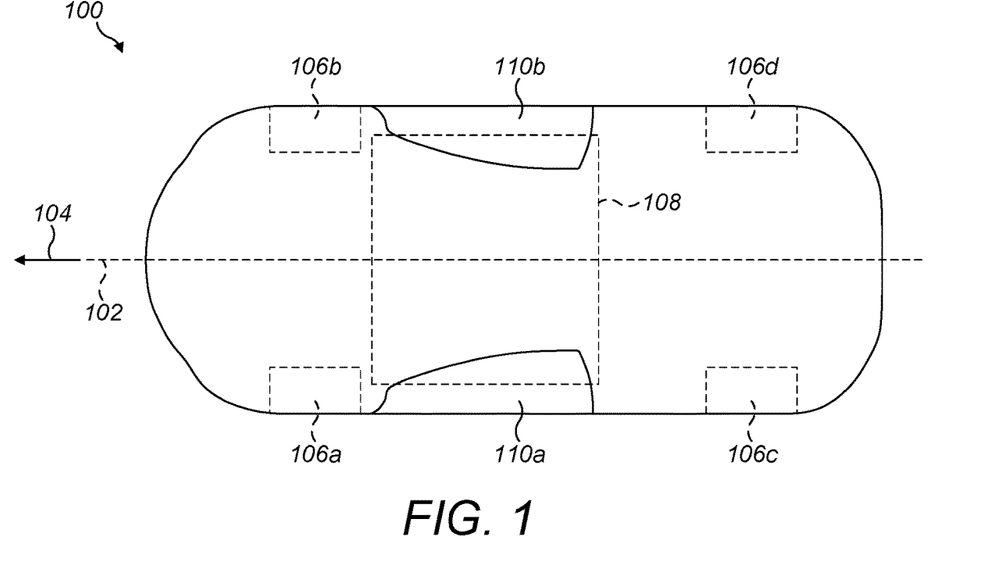
FIG. 1 shows a plan view of a vehicle.
Figure 2:
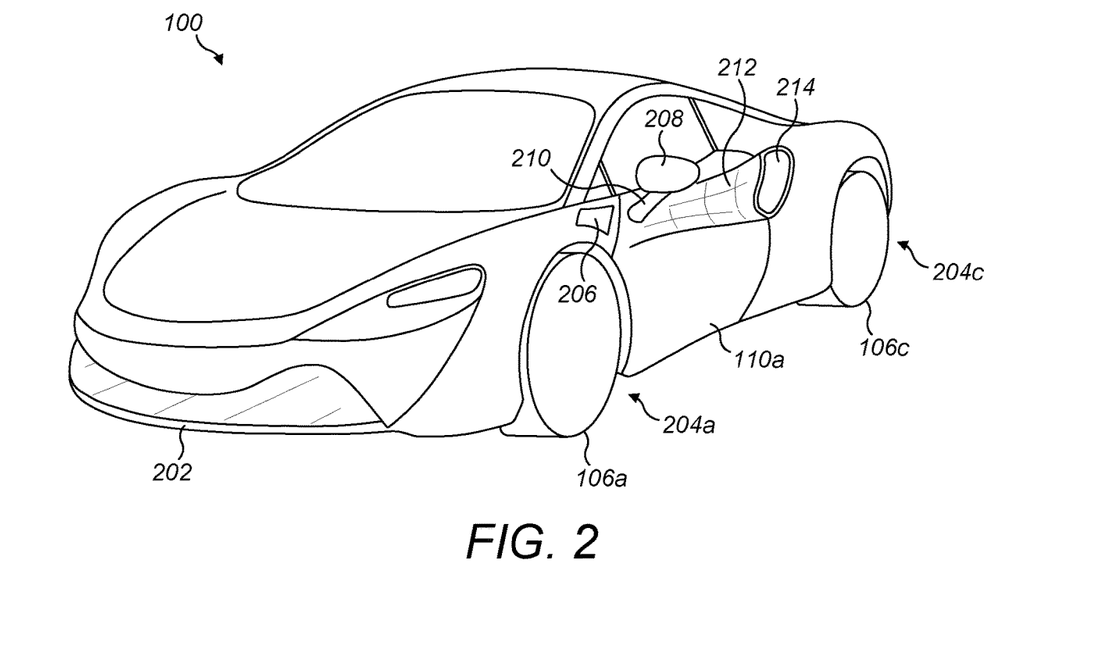
FIG. 2 shows a perspective view of a vehicle.
Figure 3:
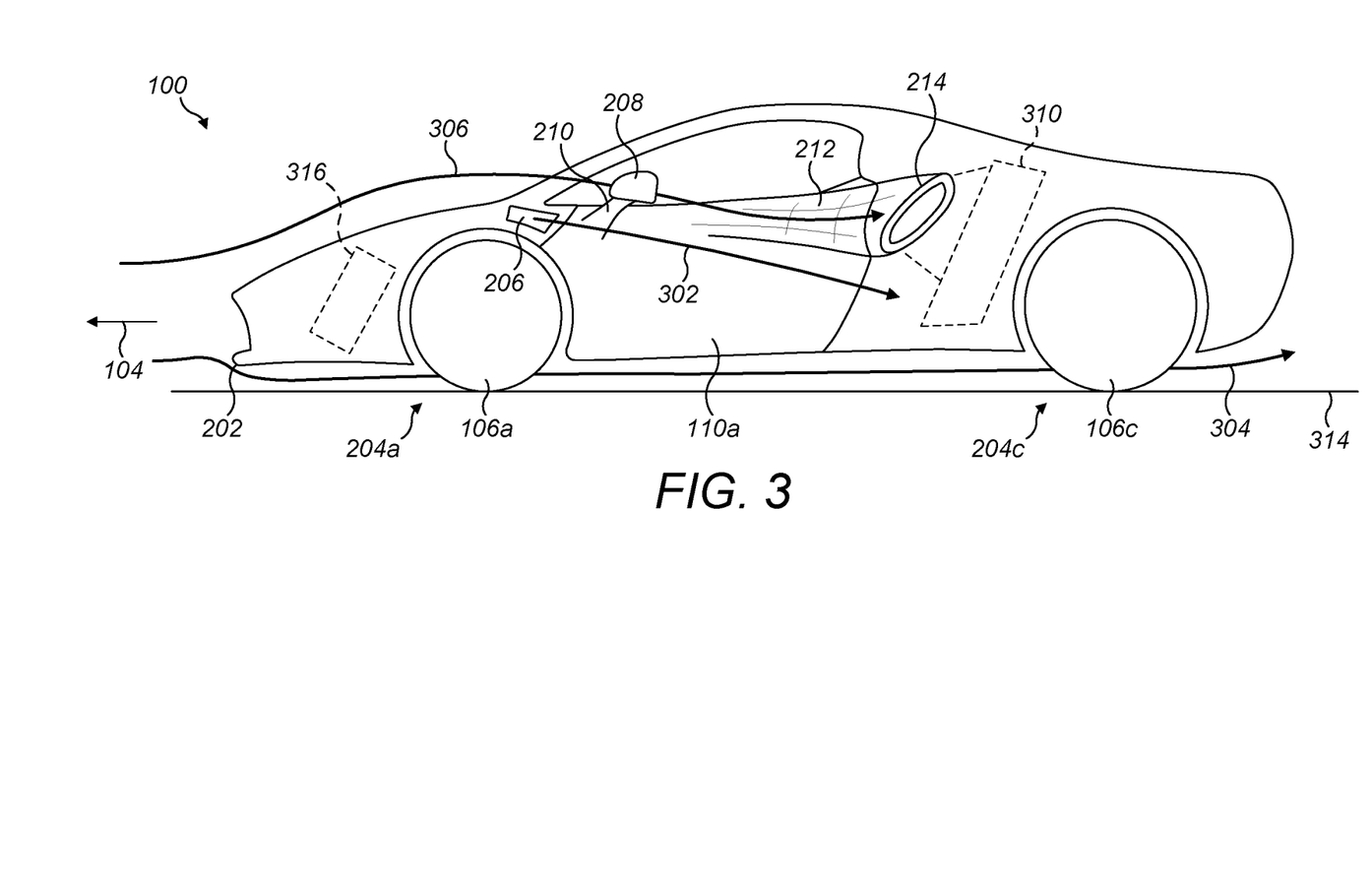
FIG. 3 shows a side view of a vehicle.

FIGS. 1 to 3 show a vehicle 100. FIG. 1 shows a plan view of the vehicle 100. FIG. 2 shows a perspective view of the vehicle 100. FIG. 3 shows a side view of the vehicle 100.

The vehicle 100 may be an automobile. The vehicle 100 may be a car. The front of the vehicle 100 is defined with reference to the primary motion direction of the vehicle 100. The front of the vehicle 100 points in the primary motion direction of the vehicle. Generally, a vehicle has a primary motion direction that is the forward direction 104. The vehicle 100 can be said to have a longitudinal axis 102. The forward direction 104 may be colinear with, or parallel to, the longitudinal axis 102 of the vehicle 100. When the vehicle is moving in the forward direction 104, it can be said to be in forward motion.

The vehicle 100 comprises a vehicle body 112. The vehicle body 112 comprises a chassis and/or tub, and a plurality of body panels. A tub is a structural component of a vehicle. A tub may be made of a composite material such as a carbon fibre/resin composite. A tub may form part of a chassis. The body panels may be attached to the chassis and/or tub. The body panels may include bonnet panels, wing panels, occupant door panels, roof panels and rear deck panels. Each of these listed example areas of body panels may be formed of one or more body panels. Each body panel may be a sheet element whose outer surface defines part of the exterior surface of the vehicle. The body panels may conveniently be made of a composite material such as a carbon fibre/resin composite, or of a metal such as aluminium or steel.

The vehicle 100 comprises front wheels 106*a* and 106*b*, and rear wheels 106*c* and 106*d*. The vehicle 100 comprises a plurality of wheel arches. The vehicle 100 comprises a wheel arch per wheel 106*a*-*d*. The vehicle 100 comprises four wheel arches: two front wheel arches and two rear wheel arches. FIGS. 2 and 3 show front wheel arch 204*a* and rear wheel arch 204*c*. FIGS. 2 and 3 primarily show the left side of the vehicle. The right side can be a mirror image. That is, it will be understood that for each component described with reference to left side of vehicle 100 shown in FIGS. 2 and 3, an identical component may also be present on the right side of vehicle 100. Front wheel 106*a* is positioned in the front wheel arch 204*a*. Rear wheel 106*c* is positioned in rear wheel arch 204*c*. The wheel arches each form an opening in the underside of the vehicle body 112 through which the respective wheel extends. The openings permit each wheel to contact a running surface 314 on which the wheels can support the vehicle 100. The running surface 314 may be, for example, a road, a racing track, or an off-road surface.

The vehicle body 112 also has an underside. The underside of the vehicle body 112 may face the running surface 314. The underside of the vehicle body 112 may comprise any portion of the vehicle body that faces the running surface 314. The underside of the vehicle body 112 may be formed of the tub and/or a plurality of panels that together form the underside of the vehicle body 112.

The vehicle 100 comprises an occupant compartment 108. The occupant compartment 108 may comprise one or more seats for occupants of the vehicle to sit in. The occupant compartment 108 may accommodate a driver. The occupant compartment 108 may accommodate one or more passengers. The vehicle 100 may comprise controls located within the occupant compartment 108 to enable an occupant to control the motion of the vehicle. The vehicle comprises one or more occupant doors 110 that enable an occupant to access the occupant compartment 108.

The vehicle shown in FIGS. 1 to 3 comprises two occupant doors 110*a* and 110*b* that enable occupants to access the occupant compartment 108 from opposite sides of the vehicle. Occupant door 110*a* is rearward of wheel arch 204*a*. The term "rearward" is defined relative to, or with reference to, the forward direction 104. In other words, occupant door 110*a* is generally a greater distance from the front of the vehicle 100 than the wheel arch 204*a*. It will be understood that the occupant door may delimit part of the wheel arch and so it is to be understood that the occupant door 110*a* runs to a position on the vehicle that is a greater distance from the front of the vehicle 100 than the wheel arch 204*a*. In other examples (not shown), the vehicle may comprise more than one occupant door on each side of the vehicle. In these examples, each occupant door would be rearward of the front wheel arch.

The vehicle 100 may be a mid- or rear-engined vehicle. In a mid-engined vehicle, the engine is typically located rearward of the front axle by which the front wheels rotate, but forward of the rear axle by which the rear wheels rotate. The terms "rearward" and "forward" are defined relative to, or with reference to, the forward direction 104. If any portion of the engine is located rearward of the rear axle by which the rear wheels rotate, the vehicle may be termed a rear-engined vehicle. In both a mid- or rear-engine vehicle the engine is generally located behind the occupant compartment 108.

Vehicle 100 comprises a heat exchanger 310. Heat exchanger 310 is covered by a body panel, and so is not visible from the exterior of the vehicle 100. The position of heat exchanger 310 is shown using hatching in FIG. 3. Heat exchanger 310 is positioned rearward of the occupant door 110*a*. The term "rearward" is defined relative to, or with reference to, the forward direction 104. In other words, heat exchanger 310 is a greater distance from the front of the vehicle 100 than the occupant door 110*a*.

Heat exchanger 310 is used to cool the engine, and/or other operational parts of the vehicle. Heat exchanger 310 may be a radiator. For example, heat energy generated by the engine may be transferred to a fluid circulating through the engine and the heat exchanger 310. The fluid may be water. In turn, the heat exchanger 310 transfers heat energy from the fluid to its surroundings. Heat exchanger 310 may have a large surface area, relative to its volume, to facilitate the transfer of heat energy from the fluid to its surroundings. The transfer of heat energy from the heat exchanger 310 to its surroundings can be increased by causing air, in particular low temperature air, to flow through (i.e. over the various surfaces of) the heat exchanger.

Positioning heat exchanger 310 rearward of the occupant door 110a is advantageous when the vehicle 100 is a mid- or rear-engined vehicle. This is because heat exchanger 310 is in close proximity to the engine—and so the length of tubing used to carry the circulating fluid to/from engine can be minimised. That said, relative to front-engined vehicles in which the heat exchanger(s) are typically positioned in the front of the vehicle and so receive an ample flow of air when the vehicle is in forward motion, the natural flow of air to heat exchanger 310 positioned rearward of the occupant door 110a may be reduced. The principles described herein are intended to address this.

Figure 4:
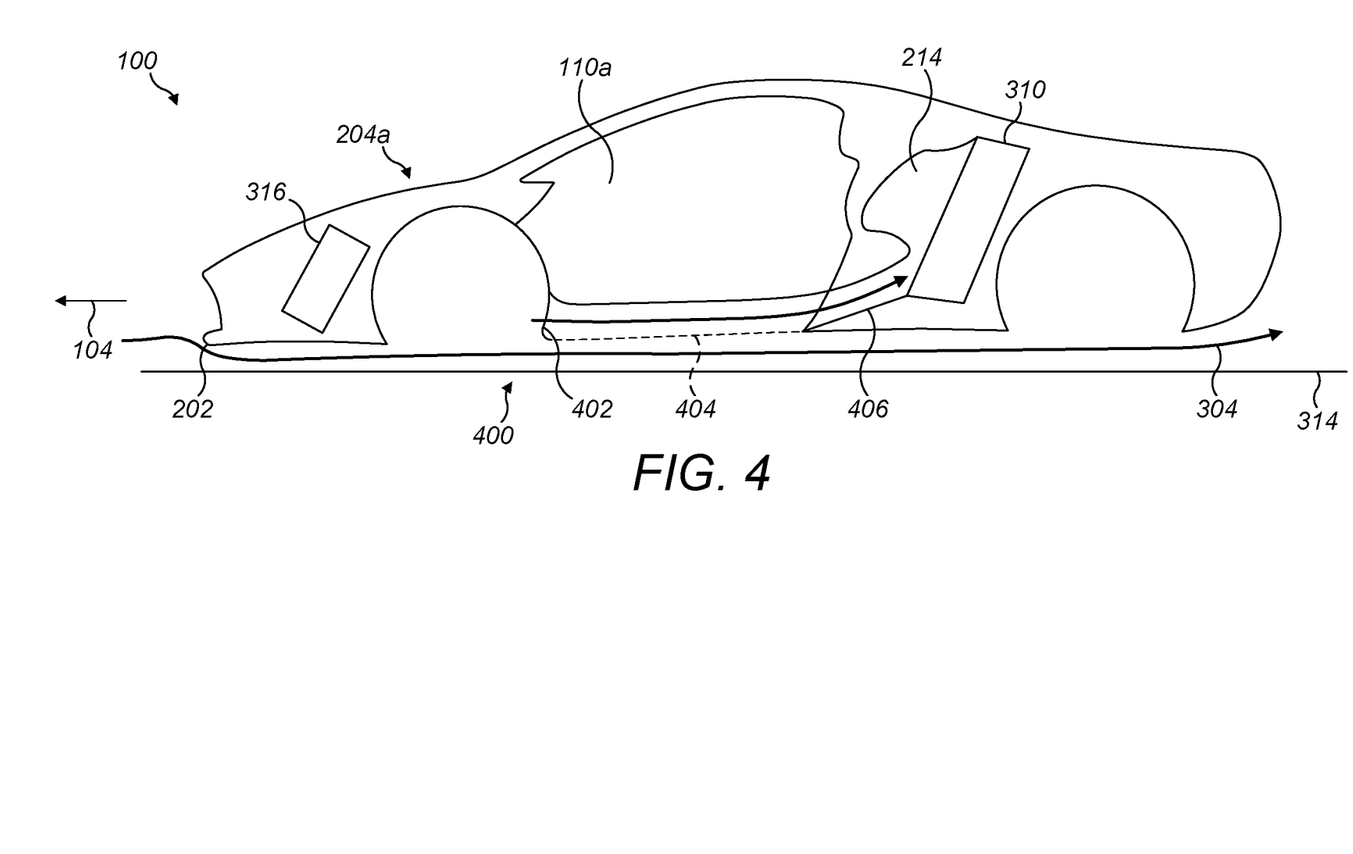
FIG. 4 shows a cross-sectional view of a vehicle.

FIG. 4 shows a cross-sectional view of vehicle 100. For simplicity, the wheels are not shown. Vehicle 100 comprises an airflow passage 400 configured such that, when the vehicle is in forward motion, the airflow passage 400 directs a first rearward airflow 410 from the wheel arch 204a to the heat exchanger 310. The airflow passage 400 comprises a channel 404 delimited by at least one surface of the occupant door 110a and being at least partially open to a running surface 314 of the vehicle 100, and a first inlet duct 406 to the heat exchanger 310. The airflow passage 400 may be configured such that, when the vehicle 100 is in forward motion, it directs a first rearward airflow 410 from an outlet 402 of the wheel arch 204a, via the channel 404 delimited by at least one surface of the occupant door 110a, to the first inlet duct 406 to the heat exchanger 310. In this way, the first rearward airflow 204 is conveyed to heat exchanger 310 in order to aid its cooling.

Channel 404 directs air from the wheel arch 204a to the first inlet duct 406. The interior surfaces of the channel 404 may be smooth. This is because flowing air loses kinetic energy, and therefore velocity, when it encounters resistance (e.g. air resistance). It is preferable for the first rearward airflow 410 to maintain a higher kinetic energy per volume, and therefore a higher velocity, as a higher velocity airflow means that more air flows through (i.e. over the various surfaces of) the heat exchanger 310 per unit time and so enables more heat energy to be transferred away from the heat exchanger 310. The smooth interior surfaces of the channel 404 can minimise the loss of kinetic energy of the first rearward airflow my reducing the resistance (e.g. air resistance) experienced by the first rearward airflow 410 as it flows through the channel 404. The interior surfaces of the channel 404 may comprise one or more gradually curved faces to direct the first rearward airflow in the desired direction. This is in contrast to having a two or more faces meeting at an abrupt angle in the path of the first rearward airflow—which would provide significant resistance to the first rearward airflow. The channel 404 may comprise one or more vanes, or other projections, in order to aid in directing the first rearward airflow 410 in the desired direction. The channel 404 may run substantially the full length of the occupant door 110a. The channel 404 may run along the bottom of the occupant door 110a.

Channel 404 may direct air from an outlet 402 of the wheel arch 204a to the first inlet duct 406. In an example, the outlet 402 may be an opening in the interior of the wheel arch 204a, such as a cut through in a rearward interior surface of the wheel arch. In a preferred example, the interior of the wheel arch 204a may be shaped so as to define the outlet 402. For example, a rearward portion of the interior of the wheel arch 204a may comprise one or more gradually curved faces arranged to form an opening that funnels airflow towards the channel 404. This rearward portion of the interior of the wheel arch 204a may be termed the outlet 404. The forward edge of occupant door 108 may delimit part of the wheel arch 204a (e.g. as can be seen in FIGS. 1 to 3). Thus, one or more gradually curved faces of a rearward portion of the interior of the wheel arch 204a and at least part of the forward edge of occupant door 108 may together define the outlet 402. The outlet 402 is positioned in the rearward half of the wheel arch 204a. The outlet 402 may be positioned in the bottom half of the wheel arch 204a. That is, the outlet 402 may be positioned in the bottom-rearward quarter of the wheel arch 204a.

In other examples (not shown in the Figures), the forward edge of the occupant door may not delimit part of the wheel arch, and may instead be positioned rearward of the wheel arch. For example, a body panel and/or portion of the tub may separate the wheel arch and the forward edge of the occupant door. In these examples, the outlet may further comprise a wheel arch duct to direct air from an opening in the wheel arch to the channel. Said wheel arch duct may pass through the vehicle body 112. Said wheel arch duct may be at least partially open to the running surface of the vehicle, or may be enclosed between the opening in the wheel arch and the entry to the channel.

Figure 5:
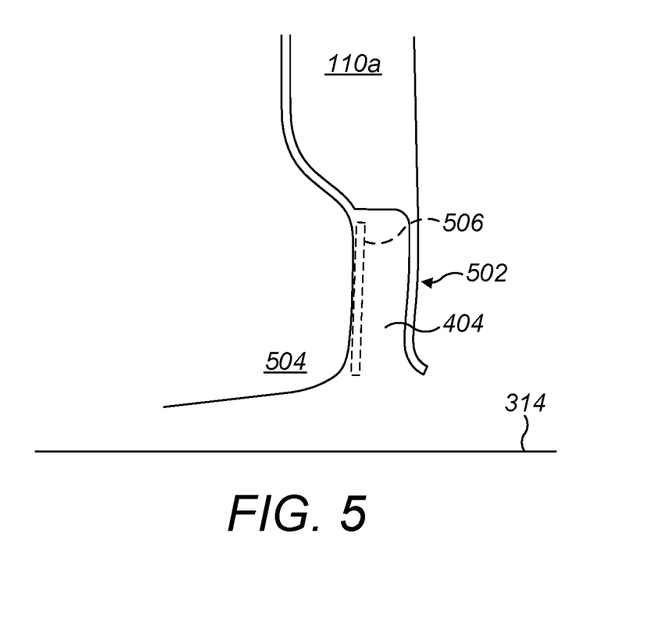
FIG. 5 shows a cross-sectional view of an occupant door of a vehicle.

Channel 404 is described in further detail with reference to FIG. 5, which shows a cross-sectional view of the bottom of occupant door 110a. Channel 404 can be formed between an extended section 502 of the occupant door 110a and the chassis or tub 504 of the vehicle, and/or between an extended section 502 of the occupant door 110a and one or more body panel(s) attached to the chassis or tub 504 of the vehicle (e.g. such as protective door opening panel 506, shown in hatching in FIG. 5). One or more panel(s) (e.g. protective panels) could also be attached to the inside surface of extended section 502. In each of these examples, channel 404 can be said to be delimited by at least one surface of the occupant door 110a. As shown in FIG. 5, the channel is at least partially open to the running surface 314 of the vehicle 100. In examples, the channel 404 may be at least 5%, at least 10%, or at least 20% open to the running surface 314 of the vehicle. For example, the channel may have a substantially rectangular cross-section, where one side of that rectangle is open to the running surface 314 of the vehicle. The channel 404 may be open to the running surface 314 of the vehicle 100 along the full extent of the occupant door 110a between the outlet 402 in the wheel arch 204a and the first inlet duct 406. In other examples, the channel 404 may be open to the running surface 314 of the vehicle 100 along less than the full extent of the occupant door 110a between the outlet 402 in the wheel arch 204a and the first inlet duct 406.

It is possible to form a closed channel through the occupant door 110a. However, providing a channel that is at least partially open to the running surface 314 of the vehicle 100 is desirable as it reduces the complexity of the manufacture of the occupant door 110a, as well as reducing the weight of the occupant door 110a.

In other examples (not shown), the vehicle may comprise multiple occupant doors on the same side. In these examples, the channel 404 may be delimited by at least one surface of each of those occupant doors.

Returning to FIG. 4, the first inlet duct 406 directs air from the channel 404 to the heat exchanger 310. The first inlet duct 406 may run through the vehicle body 112. For example, the first inlet duct 406 may run through the tub, may be delimited by a surface of the tub and an interior surface of a body panel attached to the tub, and/or may be delimited by a plurality of panels forming an enclosed duct. Said plurality of panels forming an enclosed duct may be attached to the tub, a housing for the heat exchanger 310 and/or a body panel of vehicle 100. The first inlet duct 406 may comprise an exit to the housing for the heat exchanger 310. The cross-section of the first inlet duct 406 may gradually increase in area in the rearward direction so as to enable the first rearward airflow 410 to expand over the heat exchanger 310. For example, the cross-sectional area of the exit of the first inlet duct 406 may be greater than the cross-sectional area of the entrance to the first inlet duct 406. The interior surfaces of the first inlet duct 406 may be smooth. The interior surface of the first inlet duct 406 may comprise one or more gradually curved faces to direct the first rearward airflow in the desired direction. The first inlet duct 406 may comprise one or more vanes, or other projections, in order to aid in directing the first rearward airflow 410 in the desired direction.

When the vehicle 100 is in forward motion, a second rearward airflow 304 may be directed between the underside of the vehicle 100 and the running surface 314 of the vehicle such that an airflow boundary forms between the first and second rearward airflows that reduces the amount of air of the first rearward airflow that escapes from the channel 404. The difference in velocity and/or pressure between the first rearward airflow 410 and second rearward airflow 304 may cause the formation of the airflow boundary.

The vehicle may be configured so as to increase the amount of kinetic energy, and therefore velocity, maintained by the second rearward airflow when it is directed between the underside of the vehicle 100 and the running surface 314 of the vehicle. This can aid in forming a better airflow boundary. For example, the vehicle may comprise an airflow splitter 202 forward of the wheel arch 204a to aid in directing the second rearward airflow 304 between the underside of the vehicle 100 and the running surface 314 of the vehicle. The term "forward" is defined relative to, or with reference to, the forward direction 104. In other words, airflow splitter 202 is a lesser distance from the front of the vehicle 100 than the wheel arch 204a. An airflow splitter 202 may be a portion that protrudes forward of other portions of a front bumper panel of the vehicle.

The airflow splitter 202 may cause a high pressure area over the top of the airflow splitter 202 and a low pressure area under the airflow splitter 202. The high pressure area is created by the air above the airflow splitter 202 being brought to stagnation, for example by an air dam. The low pressure area is created by the air under the airflow splitter 202 being accelerated due to its the proximity to the running surface 314 which thus reduces the pressure of this air—thus directing the second rearward airflow 304 between the underside of the vehicle 100 and the running surface 314.

It is to be understood that the vehicle 100 need not comprise an airflow splitter 202, and that other features such as a smooth underside of the vehicle, a rear diffuser and/or other vanes or projections attached to the front or underside of the vehicle can alternatively or additionally be used to increase the amount of kinetic energy maintained by the second rearward airflow when it is directed between the underside of the vehicle 100 and the running surface 314 of the vehicle.

Figure 6:
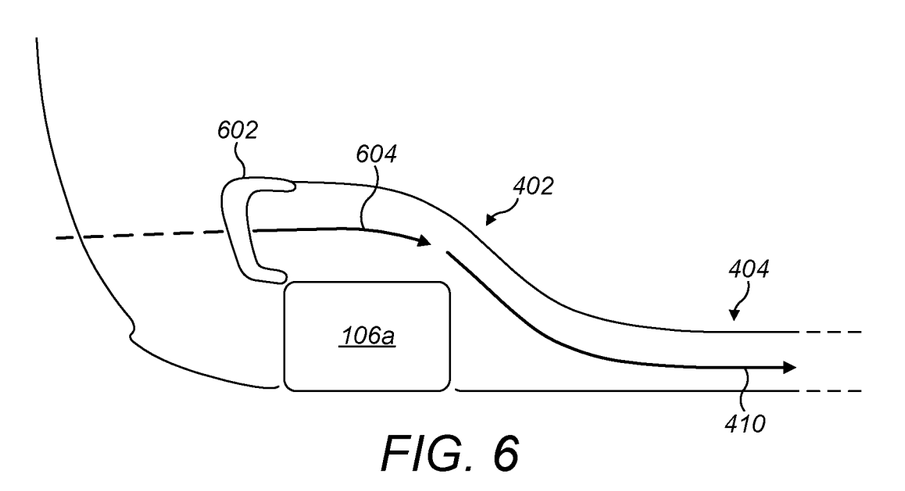
FIG. 6 shows a cross-sectional view of a wheel arch of a vehicle.

FIG. 6 shows a cross-sectional view of wheel arch 204a. As shown in FIG. 6, the vehicle 100 may also comprise an airflow diverter 602 forward of the wheel arch 204a. The term "forward" is defined relative to, or with reference to, the forward direction 104. In other words, airflow diverter 602 is a lesser distance from the front of the vehicle 100 than the wheel arch 204a. The airflow diverter 602 may be configured such that, when the vehicle is in forward motion, it directs a primary rearward airflow 604 to the channel 404. The airflow diverter 602 may comprise one or more vanes, or other projections, in order to aid in directing the primary rearward airflow 604 in the desired direction. The airflow diverter 602 may be formed in, attached to, or run through, a body panel of the underside of the vehicle body 112.

The airflow diverter 602 may be configured such that, when the vehicle is in forward motion, it directs the primary rearward airflow 604 inboard of the wheel 106a. One way of achieving this is to position the airflow diverter 602 inboard of the wheel 106a. The term "inboard" is defined relative to, or with reference to, the longitudinal axis 102 (shown in FIG. 1). That is, airflow diverter 602 is considered to be positioned inboard of the wheel 106a because the shortest distance between the airflow diverter 602 and the longitudinal axis 102 is lesser than the shortest distance between the wheel 106a and the longitudinal axis 102.

Using the airflow diverter 602 to direct the primary rearward airflow 604 inboard of the wheel 106a to the channel 404 is advantageous because this reduces the impingement of the primary rearward airflow 604 on the wheel 106a—which would provide significant resistance to the primary rearward airflow 604. Avoiding impingement on the wheel 106a reduces the losses in kinetic energy per unit volume, and therefore velocity, experienced by the primary rearward airflow 604. In this way, the airflow received at the channel 404 has a higher kinetic energy per volume, and therefore higher velocity, than if the channel 404 were to be fed primarily by air circulating within the wheel arch 204a and impinging on the wheel 106a. This in turn increases the kinetic energy per volume, and therefore velocity, of the first rearward airflow 410.

For the same reason, the interior surface of the wheel arch 204a may comprise one or more gradually curved faces to direct the primary rearward airflow 604 in the desired direction. This is in contrast to having a two or more faces meeting at an abrupt angle in the path of the primary rearward airflow—which would provide significant resistance to the primary rearward airflow.

The vehicle 100 may comprise a secondary heat exchanger 316. Secondary heat exchanger 316 is covered by a body panel, and so is not visible from the exterior of the vehicle 100. The position of secondary heat exchanger 316 is shown using hatching in FIG. 3. Secondary heat exchanger 316 is positioned forward of the wheel arch 204a. Secondary heat exchanger 316 may be used to cool operational parts of the vehicle 100 other than the engine. In an example, the secondary heat exchanger 316 may be responsible for cooling the charge air of the engine (e.g. air that has passed through a turbocharger, before it enters the engine). In another example, the secondary heat exchanger 316 may be used for cooling a condenser of a refrigerant circuit for cooling of the occupant compartment 108. In examples where the vehicle is a hybrid vehicle, the secondary heat exchanger 316 may be responsible for cooling the hybrid powertrain components, such as one or more e-motors, motor control units (power electronics for the e-motor), and/or a high voltage battery. Air flow used to cool the secondary heat exchanger 316 may be vented or exhausted into the wheel arch 204a. Air that flows through (i.e. over the various surfaces of) a heat exchanger is heated (i.e. its heat energy per unit volume, and thus its temperature, increases), as well as losing significant amounts of kinetic energy owing to resistance (e.g. air resistance) caused by impinging on the heat exchanger. Higher temperature air (i.e. air with a greater heat energy per volume) is less effective at cooling a heat exchanger—because the temperature gradient between the air and the heat exchanger is lesser.

Returning to FIG. 6, the airflow diverter 602 may be configured such that, when the vehicle is in forward motion, it receives air that forms the primary rearward airflow 604 from the underside of the vehicle in a position rearward of any secondary heat exchangers positioned in the front of the vehicle (e.g. secondary heat exchanger 316 shown in FIG. 3). That is, the primary rearward airflow 604 may be composed primarily of ambient air from the surroundings of the vehicle, that has not passed through (i.e. over the various surfaces of) a secondary heat exchanger of the vehicle. For example, the airflow diverter 602 may lift the primary rearward airflow 604 from between the underside of the vehicle and the running surface 314 upwards to the channel 404.

This is advantageous because the airflow received at the channel 404 has a higher kinetic energy and lower temperature, than if the channel 404 were to be fed primarily by air circulating within the wheel arch 204a—which may have already flowed through (i.e. over the various surfaces of) a secondary heat exchanger positioned in the front of the vehicle, and subsequently impinged on the wheel. In this way, the kinetic energy of the first rearward airflow 410 is maximised whilst its temperature is minimised—such that it can cool heat exchanger 310 more effectively.

FIG. 6 primarily shows the front-left side of the vehicle. The front-right side of the vehicle can be a mirror image. That is, with reference to FIG. 1, there may be an airflow diverter 602 for each front wheel arch 106a and 106b. The airflow diverter 602 for each front wheel arch 106a and 106b may be positioned either side of the longitudinal axis 102 of vehicle 100. Each airflow diverter 602 may direct a respective primary rearward airflow, as described herein, to its respective channel.

Returning to FIGS. 2 and 3, the vehicle 100 may also comprise a second inlet duct 214 to the heat exchanger. The second inlet duct 214 may be above the first inlet duct 406 (shown in FIG. 4). That is, the second inlet duct 214 may be a greater distance from the running surface 314 than the first inlet duct 214. The second inlet duct 214 may pass through the vehicle body. The second inlet duct 214 may enter the vehicle body at an opening in a body panel. The second inlet duct 214 may comprise an exit to a housing for the heat exchanger 310. The cross-section of the second inlet duct 214 may gradually increase in area in the rearward direction. For example, the cross-sectional area of the exit of the second inlet duct 214 may be greater than the cross-sectional area of the entrance to second inlet duct 214. As shown in cross-section in FIG. 4, the first inlet duct 406 and the second inlet duct 214 may converge forward of the heat exchanger 310.

The vehicle 100 may comprise a wheel arch duct 206. The wheel arch duct 206 may be above the channel 404. That is, the wheel arch duct 206 may be a greater distance from the running surface 314 than the channel 404. The channel 404 and the wheel arch duct 206 may both originate in wheel arch 204a. The wheel arch duct 206 may run through the vehicle body 112. For example, the wheel arch duct 206 may run through a body panel. The wheel arch duct 206 may enter the vehicle body via an opening in the interior of the wheel arch 204a. The opening to the wheel arch duct 206 may be positioned in the rearward half of the wheel arch 204a. The opening to the wheel arch duct 206 may be positioned in the upper half of the wheel arch 204a. That is, the opening to the wheel arch duct 206 may be positioned in the rearward-upper quarter of the wheel arch 204a. The interior surfaces of the wheel arch duct 206 may be smooth. The interior surface of the wheel arch duct 206 may comprise one or more gradually curved faces. The wheel arch duct 206 may comprise one or more vanes, or other projections, in order to aid in directing airflow in the desired direction. The wheel arch duct 206 may exit the vehicle body 112 via an exterior body panel, such as a front wing panel. The exit of the wheel arch duct 206 may be visible on the exterior of the vehicle 100.

The wheel arch duct 206 may be configured such that, when the vehicle 100 is in forward motion, it directs a third rearward airflow 302 from the wheel arch 204a to a position below the second inlet duct 214 to the heat exchanger 310. That is, the wheel arch duct 206 may direct the third rearward airflow 302 to not enter the second inlet duct 214 to the heat exchanger 310.

As described herein, air circulating within the wheel arch 204a may have already flowed through a secondary heat exchanger 316 positioned in the front of the vehicle 100. This means that the air circulating within the wheel arch typically has both a relatively low kinetic energy per unit volume—e.g. owing to air resistance provided by the heat exchanger 316 and impingement on the wheel 106a—and a relatively high temperature (compared to ambient air). Were the wheel arch 204a not to comprise the wheel arch duct 206, air circulating within the wheel arch 204a would likely escape the wheel arch 204a in a disordered manner in a direction substantially perpendicular to the forward direction 104. Some or all of the air escaping from the wheel arch 204a in that manner would likely enter the second inlet duct 214. As this air has a relatively low kinetic energy per unit volume, and a relatively high temperature (compared to ambient air) its cooling effect on the heat exchanger 310 would be limited if it were allowed to escape in this way.

Instead, this is the air that is received by the wheel arch duct 206 and forms the third rearward airflow 302. This means that the third rearward airflow 302 has a relatively low kinetic energy per unit volume, and a relatively high temperature (compared to airflows formed of ambient air)— meaning that its cooling effect on the heat exchanger 310 would be limited. By directing the third rearward airflow 302 to a position below the second inlet duct 214 to the heat exchanger 310, the wheel arch duct 206 enables the second inlet duct 214 to receive a fourth rearward airflow 306 when the vehicle is in forward motion. That is, the third rearward airflow 302 may be directed so as to minimise its impingement on the fourth rearward airflow 306. The fourth rearward airflow 306 may comprise ambient air from the surroundings of the vehicle 100. Thus, the fourth rearward airflow 306 may comprise more kinetic energy per volume than the third rearward airflow 302 and/or less heat energy per volume than the third rearward airflow 302—such that it can cool heat exchanger 310 more effectively than the third rearward airflow 302.

It is to be understood that not all of the air circulating within the wheel arch 204a need have flowed through a secondary heat exchanger. For example, the vehicle may not comprise secondary heat exchanger 316, or secondary heat exchanger 316 may primarily vent or exhaust air elsewhere and not into the wheel arch. That is, some or all of the circulating air may have entered the wheel arch 204a from the ambient air surrounding the vehicle. In these examples, the air circulating within the wheel arch 204a may still have a relatively low kinetic energy per unit volume (compared to ambient air) owing to impingement of that air on the wheel 106a—meaning that its cooling effect on the heat exchanger 310 would be limited. Thus, wheel arch duct 206 as described herein is also advantageous in these examples.

The vehicle may comprise other features to aid the wheel arch duct 206 in directing the third rearward airflow 302. For example, the vehicle 100 may comprise a projection 210 on the occupant door 110a. The projection 210 may be configured such that, when the vehicle 100 is in forward motion, the third rearward airflow 302 impinges on the projection 210 such that the projection 210 assists the wheel arch duct 206 in directing the third rearward airflow 302 from the wheel arch 204a to the position below the second inlet duct 214 to the heat exchanger. The projection may be wing mirror 208, or a component of a wing mirror 208 such as a wing mirror arm stem 210.

The vehicle may comprise other features to aid the second inlet duct 214 in receiving the fourth rearward airflow 306 when the vehicle is in forward motion. For example, the occupant door 110a may comprise a concave surface 212 configured such that, when the vehicle 100 is in forward motion, it directs the fourth rearward airflow 306 into the second inlet duct 214 to the heat exchanger 310. The concave surface 212 may be smooth so as to reduce the air resistance experienced by the fourth rearward airflow 306. The concave surface 212 may be formed in an occupant door panel.

The wheel arch duct 206 may also be configured to direct the third rearward airflow 302 to remain substantially attached to the vehicle 100. As described herein, were the wheel arch 204a not to comprise the wheel arch duct 206, air circulating within the wheel arch 204a would likely escape the wheel arch 204a in a disordered manner in a direction substantially perpendicular to the forward direction 104. Airflow escaping in that manner would increase the wake of the vehicle 100, and so increase its drag. By enabling air circulating within the wheel arch 204a to escape the wheel arch 204a via the wheel arch duct 206 in a rearward direction substantially parallel with the forward direction 104, the third rearward airflow 302 is able to remain substantially attached to the exterior of the vehicle 100. This reduces the vehicles wake and drag. Thus, the wheel arch duct 206 also reduces the drag of the vehicle, in addition to improving the cooling of heat exchanger 310.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A vehicle comprising:
    a wheel arch;
    an occupant door rearward of the wheel arch;
    a heat exchanger rearward of the occupant door;
    an airflow passage comprising:
        a channel running along a bottom of the occupant door, being inboard of an exterior surface of the occupant door along a length of the channel, being delimited by at least one surface of the occupant door, and being at least partially open to a running surface of the vehicle; and
        a first inlet duct to the heat exchanger;
    a wheel positioned in the wheel arch; and
    an airflow diverter forward of the wheel arch,
    wherein the airflow passage and the airflow diverter are configured such that, when the vehicle is in forward motion, the airflow passage and the airflow diverter direct a first rearward airflow from a surrounding of the vehicle, inboard of the wheel, through an outlet of the wheel arch, through the channel delimited by the at least one surface of the occupant door, and through the first inlet duct to the heat exchanger for cooling the heat exchanger.

2. The vehicle as claimed in claim 1, wherein a second rearward airflow is directed between an underside of the vehicle and the running surface of the vehicle when the vehicle is in forward motion such that an airflow boundary forms between the first and second rearward airflows that reduces an amount of air of the first rearward airflow that escapes from the channel delimited by at least one surface of the occupant door and being at least partially open to the running surface of the vehicle.

3. The vehicle as claimed in claim 2, the vehicle further comprising an airflow splitter forward of the wheel arch, the airflow splitter being configured such that, when the vehicle is in forward motion, the airflow splitter directs the second rearward airflow between the underside of the vehicle and the running surface of the vehicle.

4. The vehicle as claimed in claim 1, the vehicle further comprising a second inlet duct to the heat exchanger, wherein the second inlet duct to the heat exchanger is above the first inlet duct to the heat exchanger.

5. The vehicle as claimed in claim 4, the vehicle further comprising a wheel arch duct configured such that, when the vehicle is in forward motion, the wheel arch duct directs a third rearward airflow from the wheel arch to a position below the second inlet duct to the heat exchanger so as to direct the third rearward airflow to not enter the second inlet duct to the heat exchanger, wherein the third rearward airflow has a higher temperature and/or lower kinetic energy than an airflow formed of ambient air surrounding the vehicle.

6. The vehicle as claimed in claim 1, wherein the outlet of the wheel arch is an opening in an interior of the wheel arch, the outlet of the wheel arch is positioned in a bottom half of the wheel arch, the interior of the wheel arch is shaped so as to define the outlet of the wheel arch, and the interior of the wheel arch comprises one or more gradually curved faces.

7. The vehicle as claimed in claim 1, wherein the vehicle is a mid-or rear-engined vehicle.

8. A vehicle comprising:
    a wheel arch;
    an occupant door rearward of the wheel arch;
    a heat exchanger rearward of the occupant door;
    an airflow passage configured such that, when the vehicle is in forward motion, the airflow passage directs a first rearward airflow from an outlet of the wheel arch to the heat exchanger for cooling the heat exchanger, the airflow passage comprising:

a channel running along a bottom of the occupant door, being inboard of an exterior surface of the occupant door along a length of the channel, being delimited by at least one surface of the occupant door, and being at least partially open to a running surface of the vehicle;

a first inlet duct to the heat exchanger;

a second inlet duct to the heat exchanger; and a wheel arch duct above the outlet of the wheel arch, the wheel arch duct configured to direct airflow downward when the vehicle is in forward motion such that, when the vehicle is in forward motion, the wheel arch duct directs a third rearward airflow from the wheel arch to a position below the second inlet duct to the heat exchanger so as to direct the third rearward airflow to not enter the second inlet duct to the heat exchanger, wherein the third rearward airflow has a higher temperature and/or lower kinetic energy than an airflow formed of ambient air surrounding the vehicle;

wherein the wheel arch duct comprises one or more vanes or first projections which to direct the third rearward airflow from the wheel arch to the position below the second inlet duct to the heat exchanger.

9. The vehicle as claimed in claim 8, the vehicle further comprising a secondary heat exchanger forward of the wheel arch, wherein the wheel arch duct is configured to (i) receive air that has passed through the secondary heat exchanger and (ii) direct the third rearward airflow to remain attached to the vehicle.

10. The vehicle as claimed in claim 8, the vehicle further comprising a second projection on the occupant door, the second projection being configured such that, when the vehicle is in forward motion, the third rearward airflow impinges on the second projection such that the second projection assists the wheel arch duct in directing the third rearward airflow from the wheel arch to the position below the second inlet duct to the heat exchanger.

11. The vehicle as claimed in claim 10, wherein the second projection is a wing mirror or a component of the wing mirror.

12. The vehicle as claimed in claim 8, wherein the second inlet duct to the heat exchanger is (i) above the first inlet duct to the heat exchanger, and (ii) configured to receive a fourth rearward airflow composed of ambient air from a surroundings of the vehicle when the vehicle is in forward motion.

13. The vehicle as claimed in claim 12, wherein the fourth rearward airflow comprises more kinetic energy per volume than the third rearward airflow and/or the fourth rearward airflow comprises less heat energy per volume than the third rearward airflow.

14. The vehicle as claimed in claim 12, wherein the occupant door comprises a concave surface configured such that, when the vehicle is in forward motion, the concave surface directs the fourth rearward airflow into the second inlet duct to the heat exchanger for cooling the heat exchanger.

15. The vehicle as claimed in claim 8, wherein a longitudinal axis of the vehicle separates a left side of the vehicle from a right side of the vehicle, the first and second inlet ducts to the heat exchanger are both located on the left or right side of the vehicle.

16. The vehicle as claimed in claim 15, comprising third and fourth inlet ducts to the heat exchanger that are both located on the other of the left or right side of the vehicle.

17. A vehicle comprising:

a wheel arch;

an occupant door rearward of the wheel arch;

a heat exchanger rearward of the occupant door;

an airflow passage configured such that, when the vehicle is in forward motion, the airflow passage directs a first rearward airflow from an outlet of the wheel arch to the heat exchanger for cooling the heat exchanger, the airflow passage comprising:

a channel delimited by at least one interior surface of the occupant door, and being at least partially open to a running surface of the vehicle; and a first inlet duct to the heat exchanger;

a second inlet duct to the heat exchanger, wherein the second inlet duct to the heat exchanger is above the first inlet duct to the heat exchanger and wherein the first and second inlet ducts to the heat exchanger converge forward of the heat exchanger; and a wheel arch duct configured such that, when the vehicle is in forward motion, the wheel arch duct directs a third rearward airflow of air from the wheel arch to a position below the second inlet duct to the heat exchanger, wherein the wheel arch duct is above the channel delimited by at least one surface of the occupant door.

18. The vehicle as claimed in claim 17, wherein the channel runs along a bottom of the occupant door and is inboard of an exterior surface of the occupant door along a length of the channel.

19. The vehicle as claimed in claim 17, wherein the wheel arch duct is configured such that, when the vehicle is in forward motion, the wheel arch duct directs the third rearward airflow from the wheel arch to the position below the second inlet duct to the heat exchanger so as to direct the third rearward airflow to not enter the second inlet duct to the heat exchanger, wherein the third rearward airflow has a higher temperature and/or lower kinetic energy than an airflow formed of ambient air surrounding the vehicle.

20. The vehicle as claimed in claim 17, the vehicle further comprising an airflow diverter forward of the wheel arch, wherein the airflow passage and the airflow diverter are configured such that, when the vehicle is in forward motion, the airflow passage and the airflow diverter direct the first rearward airflow from a surroundings of the vehicle, inboard of a wheel within the wheel arch, through the outlet of the wheel arch, through the channel, and through the first inlet duct to the heat exchanger for cooling the heat exchanger.

* * * * *

UNITED STATES PATENT AND TRADEMARK OFFICE
CERTIFICATE OF CORRECTION

PATENT NO. : 12,391,111 B2  
APPLICATION NO. : 17/670208  
DATED : August 19, 2025  
INVENTOR(S) : Michael Judge Page 1 of 1

It is certified that error appears in the above-identified patent and that said Letters Patent is hereby corrected as shown below:

In the Claims

Claim 7
Column 12, Line 61, delete "mid-or" and insert --mid- or--.

Claim 8
Column 13, Line 9, after "vehicle;" insert --and--.

Signed and Sealed this
Seventh Day of October, 2025

John A. Squires
*Director of the United States Patent and Trademark Office*